Sept. 19, 1961 — W. G. KOGEL — 3,000,196
ABSORPTION REFRIGERATION
Filed Oct. 27, 1958 — 2 Sheets-Sheet 1

INVENTOR.
Wilhelm Georg Kogel
BY
his ATTORNEY

Sept. 19, 1961 W. G. KOGEL 3,000,196
ABSORPTION REFRIGERATION
Filed Oct. 27, 1958 2 Sheets-Sheet 2
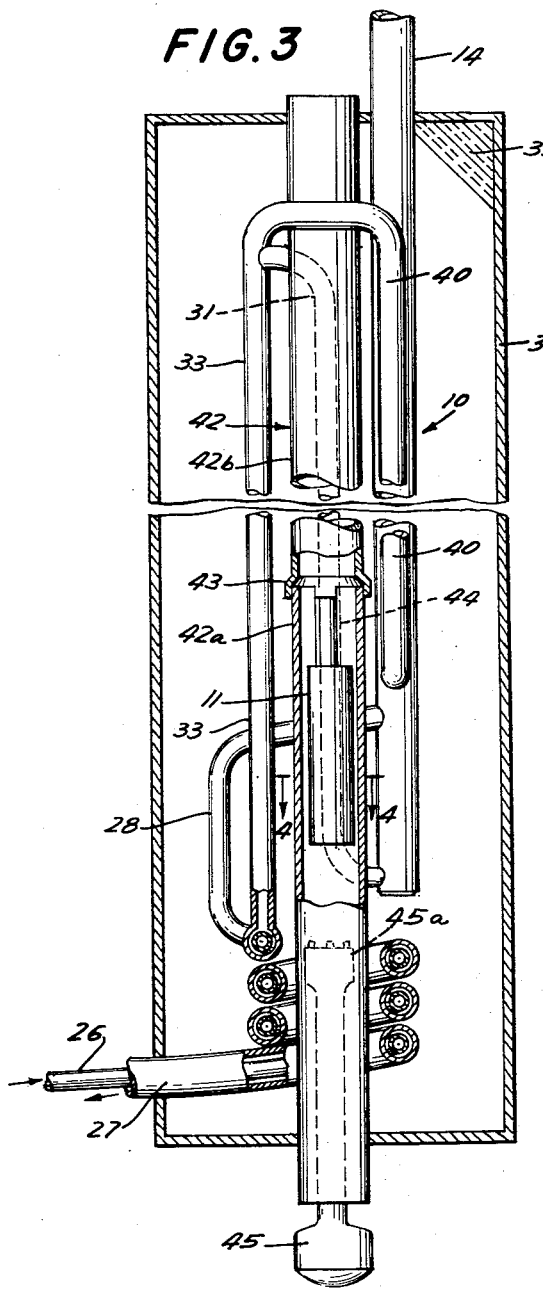
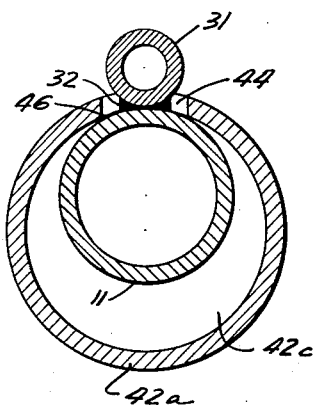
INVENTOR.
Wilhelm Georg Kogel
BY
ATTORNEY United States Patent Office 3,000,196
Patented Sept. 19, 1961

3,000,196
ABSORPTION REFRIGERATION
Wilhelm Georg Kogel, Stockholm, Sweden, assignor to Aktiebolaget Electrolux, Stockholm, Sweden, a corporation of Sweden
Filed Oct. 27, 1958, Ser. No. 769,708
Claims priority, application Sweden Oct. 29, 1957
5 Claims. (Cl. 62—487)

My invention relates to absorption refrigeration apparatus of the kind in which vapor is expelled out of solution by heating.

It is an object of my invention to provide for absorption refrigeration apparatus of this type an improved heating structure which is suitable for operation with a fluid fuel burner and is of simplified construction and requires a minimum number of parts.

Another object of my invention is to provide for a vapor-expulsion unit of absorption refrigeration apparatus of this type improved heating structure which is suitable for operation with a fluid fuel burner and includes as a component part thereof a heater member which also can be efficiently employed as a component part of another form of heating structure suitable for electrical operation.

The invention, together with the above and other objects and advantages thereof, will be more fully understood upon reference to the following description and accompanying drawing forming a part of this specification, of which:

FIG. 3 is an enlarged fragmentary view of parts shown in FIG. 1 to illustrate details more clearly; and FIG. 4 is a fragmentary horizontal sectional view taken at line 4—4 of FIG. 3.

Figure 1:
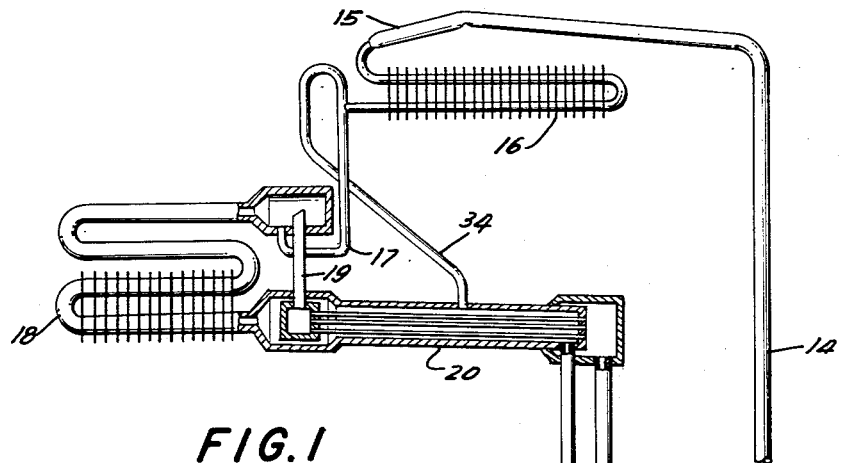
FIG. 1 illustrates more or less diagrammatically absorption refrigeration apparatus provided with heating structure which embodies my invention and is adapted to be employed with a fluid fuel burner.

Referring to FIG. 1, I have shown my invention embodied in an absorption refrigeration system of a uniform pressure type in which an inert pressure equalizing gas is employed. A refrigeration system of this type comprises a vapor-expulsion unit 10 containing a refrigerant, such as ammonia, in solution in a body of absorption liquid, such as water. Heat is supplied to the vapor-expulsion unit 10 from a heating tube 11 in a manner to be described presently. Let us assume that the refrigeration system of FIG. 1 is provided with heating structure like that illustrated in FIG. 2 in which the heating tube 11 is arranged to be heated by an electrical heating element 12 disposed within the tube.

The heat supplied to the vapor-expulsion unit and absorption solution contained therein expels refrigerant vapor out of solution, and, in a manner which will be described hereinafter, the refrigerant vapor passes upwardly from the vapor expulsion unit 10 through a vapor supply line or conduit 14 and an air-cooled rectifier 15 into an air-cooled condenser 16 in which it is condensed and liquefied. Liquid refrigerant flows from condenser 16 through a conduit 17 into a cooling element 18 in which it evaporates and diffuses into an inert pressure equalizing gas, such as hydrogen, which enters through a conduit 19. Due to evaporation of refrigerant fluid into inert gas in cooling element 18, a refrigerating effect is produced with consequent absorption of heat from the surroundings.

The rich gas mixture of refrigerant vapor and inert gas formed in cooling element 18 flows from the lower part thereof through one passage of a gas heat exchanger 20, a conduit 21 and an absorber vessel 22 into the lower end of an absorber coil 23. In absorber coil 23 the rich gas mixture flows counter-current to downwardly flowing absorption liquid which enters through a conduit 24. The absorption liquid absorbs refrigerant vapor from inert gas and inert gas weak in refrigerant flows from absorber coil 23 in a path of flow including a conduit 25, another passage of gas heat exchanger 20 and conduit 19 into the upper part of cooling element 18.

Absorption solution enriched in refrigerant flows from the absorber vessel 22 through a conduit 26, an inner passage of a liquid heat exchanger 27 and a connection 28 into a vertically extending pipe 29 at a point 30 which is at a level below the liquid surface level of the body of liquid held in the absorber vessel 22. The extreme lower end of pipe 29 is in communication with the lower end of a pump pipe or vapor lift tube 31 in thermal exchange relation with the heating tube 11 at 32, as by welding, for example. The part of the pump or lift pipe 31 in thermal exchange relation with the heating tube 11 may be referred to as the vapor-forming part, in which vapor bubbles are formed due to heat derived from the heating tube. Due to the formation of these vapor bubbles which tend to collect and become larger and larger, liquid in the lift pipe 31 becomes segregated, whereby slugs of liquid are caused to rise in the lift pipe by vapor lift action. Upward movement is imparted to liquid in the vapor lift pipe 31 under the influence of a "reaction head" formed by the liquid column maintained in pipe 29.

Vapor generated in the vapor lift pipe 31 flows from the upper end thereof through the upper part of standpipe 33 and a conduit 40 to a region 41 in pipe 29 which serves as an analyzer and is disposed below the liquid surface level A of the liquid column contained therein, the liquid level A being essentially the same as the liquid level B in the absorber vessel 22. The absorption liquid introduced into the analyzer 41 is relatively rich in refrigerant and at a lower temperature than the generated vapor, and, in bubbling through the enriched solution, water vapor present in the vapor is cooled sufficiently and condenses and in this way is removed from ammonia vapor.

The absorption liquid from which refrigerant vapor has been expelled flows by gravity from standpipe 33 through the outer passage of liquid heat exchanger 27 and conduit 24 into the upper part of absorber coil 23. The outlet end of condenser 16 is connected by a conduit 34 to a part of the gas circuit, as to the outer passage of the gas heat exchanger 20, for example, so that any inert gas which may pass through the condenser 16 can flow to the gas circuit.

Figure 2:
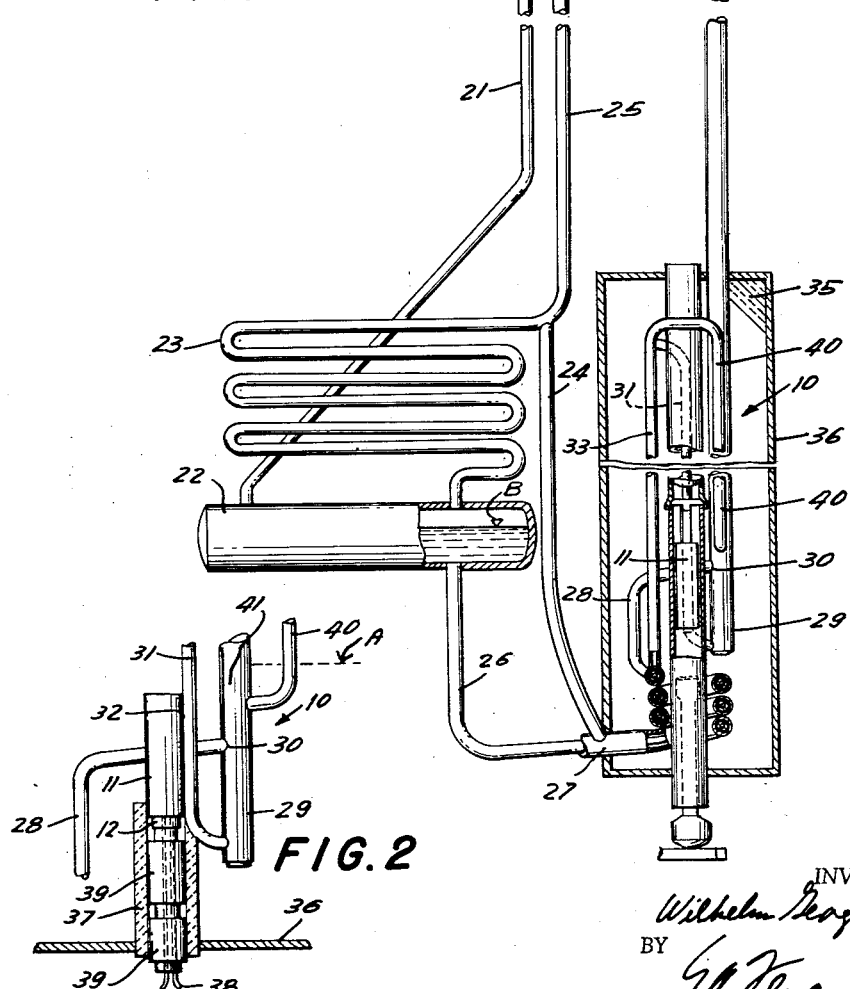
FIG. 2 is an enlarged fragmentary view of parts of the refrigeration apparatus shown in FIG. 1 provided with heating structure adapted to be employed with an electrical heating element.

The vapor expulsion unit 10 in its entirety, together with a major portion of the liquid heat exchanger 27, are embedded in a body of insulating material 35 retained in a metal shell or casing 36 having an opening at the bottom thereof. The heating tube 11 is embedded in a part of the body of insulating material 35 which is intermediate the ends thereof and spaced from the top and bottom ends of the shell 36. In FIG. 2 the electrical heating element 12 is arranged to be positioned within the heating tube 11 through a hollow sleeve member 37 which is formed of suitable insulating material and extends from the bottom of the heating tube 11 to the bottom opening in the shell 36.

The electrical conductors 38 for electrical heating element 12 extend through a pair of apertured insulating members 39 held in end-to-end relation in the hollow sleeve member 37. The heating tube 11 snugly receives the heating element 12 which may comprise a cartridge housing an electrical wire or the like having a relatively high resistance that generates heat when connected to a source of electrical energy.

In accordance with my invention, the heating tube 11 may be employed as a component part of heating structure adapted to be employed with an electrical heating element, in the manner just described and illustrated in FIG. 2; and also as a component part of heating structure adapted to be employed with a fluid fuel burner in the manner illustrated in FIGS. 1, 3 and 4. In FIGS. 1, 3 and 4, the heating tube 11 is vertically disposed within a flue pipe 42 having a bottom section 42a which projects through the bottom opening in the shell 36, and a top section 42b which projects through a top opening in the shell 36 and is formed with a collar 43 at its lower end which fits snugly over the upper end of the bottom flue pipe section 42a.

In order to position the heating tube 11 within the bottom flue pipe 42, the extreme upper end of the flue pipe section 42a is formed with a vertically extending slot 44 of sufficient height to permit it to be moved upwardly in the gap between the heating tube 11 and pump pipe 31 at the immediate vicinity of the welded joint 32 therebetween. A suitable gaseous fuel burner 45, which may be supported in any suitable manner at the bottom end of the flue pipe 42, is provided with a burner head 45a disposed within the bottom flue pipe section 42a.

It will be understood that a gap of suitable size is formed between the burner 45 and bottom flue pipe section 42a to provide a passage for secondary air which will insure complete combustion of the mixture of gaseous fuel and primary air discharged from the burner head 45a.

The burner head 45a desirably should be positioned within the bottom flue pipe section 42a so that the combustion gases will be used most effectively for heating the heating tube 11. As seen in FIGS. 3 and 4, the combustion gases flow in intimate contact with and pass over both the inner and outer surfaces of the heating tube 11 whose outer diameter is more than one-half of the inner diameter of the bottom flue pipe section 42a and therefore occupies a major portion of the cross-sectional area of the flue pipe passage 42c. By positioning the heating tube 11 in the flue pipe 42 in the manner just described and illustrated, parallel paths of flow for combustion gases are provided having a first pair of inlets at the lower end of the tube 11 and a second pair of outlets at the upper end of the tube, whereby both the inner and outer surfaces of the heating tube 11 will be in the paths of upwardly flowing combustion gases. The bottom flue pipe section 42a desirably is positioned so that regions thereof at the vicinity of the slot 44 are in intimate contact with the heating tube 11, as indicated at 46 in FIG. 4, so that a good heat conductive path is provided between the heating tube 11 and bottom flue pipe section 42a.

In view of the foregoing, it will now be understood that the heating tube 11 of the refrigeration apparatus may be employed as a component part of one form of heating structure suitable for electrical operation and also as a component part of another form of heating structure suitable for gas operation. When refrigeration apparatus like that illustrated in FIG. 1 is intended to be operated electrically, the hollow insulating sleeve 37 is positioned between the heating tube 11 and bottom opening in the shell 36, as seen in FIG. 2, before the insulating material 35 is placed within the shell 36. The hollow sleeve 37 provides a passage for inserting the electrical heating element 12 within the heating tube 11. When the refrigeration apparatus is intended to be operated by a gaseous fuel, the flue pipe sections 42a and 42b are positioned in end-to-end relation to form the upright flue pipe 42 within which the heating tube 11 is disposed.

After the refrigeration apparatus is fabricated with the pump pipe 31 and heating tube 11 joined together by the weld 32, no further welding is required to provide one or the other form of heating structure described above suitable for electrical or gas operation. The form of heating structure illustrated in FIG. 2 provides an efficient arrangement for employing an electrical heating element to operate the refrigeration apparatus. Similarly, the form of heating structure illustrated in FIGS. 1, 3 and 4 provides an efficient arrangement for employing a fluid fuel burner to operate the refrigeration apparatus. In this way, a single production line can be maintained for fabricating refrigeration apparatus which can be used with either form of heating structure suitable for electrical or gas operation.

As best shown in FIG. 2 the length of the heating tube 11 is substantially limited to the length of the welded joint 32 which heat conductively connects the heating tube 11 and pump pipe 31. With both electrical and gas operation, therefore, effective heating of the pump pipe 31 is effected with the heating structures illustrated and described above because in each instance the source of heat is concentrated on the heating tube 11 and heat losses, that is, heat not effectively given up to the pump pipe 31, are at a minimum.

While I have shown and described a single embodiment of my invention, it will be apparent that modifications and changes may be made without departing from the spirit and scope of my invention. For example, in some instances it may be desirable to provide a vapor-expulsion unit or generator in which the lower part of the pipe 29 is also heat conductively connected to the heating tube 11 by a welded joint similar to the welded connection 32 for the pump pipe 31. In such case, the bottom flue pipe section 42a may be provided with a pair of vertical slots so that it can be moved upwardly in the gap between the pipe 29 and heating tube 11 as well as the gap 44 in FIG. 4 when the flue pipe sections 42a and 42b are assembled to form the flue pipe 42. I therefore do not wish to be limited to the embodiment shown in the drawing and described in the specification, and I intend in the following claims to cover all modifications and changes which fall within the true spirit and scope of the invention.

I claim:

1. In absorption refrigeration apparatus, an upright shell having an upstanding side wall and a top and bottom and insulation therein, a vapor-expulsion unit embedded in the insulation, said vapor-expulsion unit having at least one part in which vapor is expelled from solution by heating, a vertically extending heating tube which is disposed in said shell and spaced from the top and bottom and also removed from the side wall, means heat conductively connecting the exterior surfaces of said tube and said part along a line which extends lengthwise of said tube, said heating tube being hollow and adapted to receive an electrical heating element for operating the apparatus electrically, and means for operating the apparatus with a combustible fuel mixture comprising a flue pipe for combustion gases which extends through said shell between the top and bottom thereof, the top and bottom of said shell having openings communicating with the upper and lower ends of said flue pipe, the cross-sectional area of said flue pipe being greater than that of said heating tube, and means for positioning said heating tube in said flue pipe to provide parallel paths of flow for combustion gases having a first pair of inlets at the lower end of said tube and a second pair of outlets at the upper end of said tube whereby both the inner and outer surfaces of said tube are in the paths of upwardly flowing combustion gases.

2. Apparatus as set forth in claim 1 in which said flue pipe comprises top and bottom pipe sections joined to one another, one of said pipe sections having a slot extending lengthwise thereof, the opposing edges of said slot being disposed between said heating tube and said vapor-expulsion part and at the vicinity of said heat conductive connecting means.

3. Apparatus as set forth in claim 1 which includes a fluid fuel burner having its discharge orifice disposed within said flue pipe at such a region that the maximum temperature of the combustion gases produced during operation of the burner is developed along a vertical range of the flue pipe at which said heating tube is heat conductively connected to said vapor-expulsion part.

4. In absorption refrigeration apparatus, a vapor-expulsion unit comprising a plurality of upright pipes serving as a vapor-liquid lift pump, heating tube and flue, respectively, means heat conductively connecting the exterior surfaces of the pipes serving as said heating tube and said lift pump, respectively, along a line which extends lengthwise of said tube, said heating tube being hollow and adapted to receive an electrical heating element for operating the apparatus electrically, means for operating the apparatus with a combustible fuel mixture comprising said flue pipe whose cross-sectional area is greater than that of said heating tube and provides a path of flow for combustion gases, and means for positioning said heating tube in said flue pipe to provide parallel paths of flow for combustion gases having a first pair of inlets at the lower end of said tube and a second pair of outlets at the upper end of said tube whereby both the inner and outer surfaces of said tube are in the paths of upwardly flowing combustion gases.

5. Apparatus as set forth in claim 4 in which said flue pipe comprises top and bottom pipe sections joined to one another, at least one of said flue pipe sections having a slot whose opposing edges are disposed between said pump pipe and said heating tube at the vicinity of said heat conductive connecting means.

References Cited in the file of this patent

UNITED STATES PATENTS

| | | |
|---|---|---|
| 1,729,355 | Munters | Sept. 24, 1929 |
| 2,306,704 | Kogel | Dec. 29, 1942 |